(No Model.)  2 Sheets—Sheet 1.
A. CRONKHITE.
GATE.
No. 517,331. Patented Mar. 27, 1894.
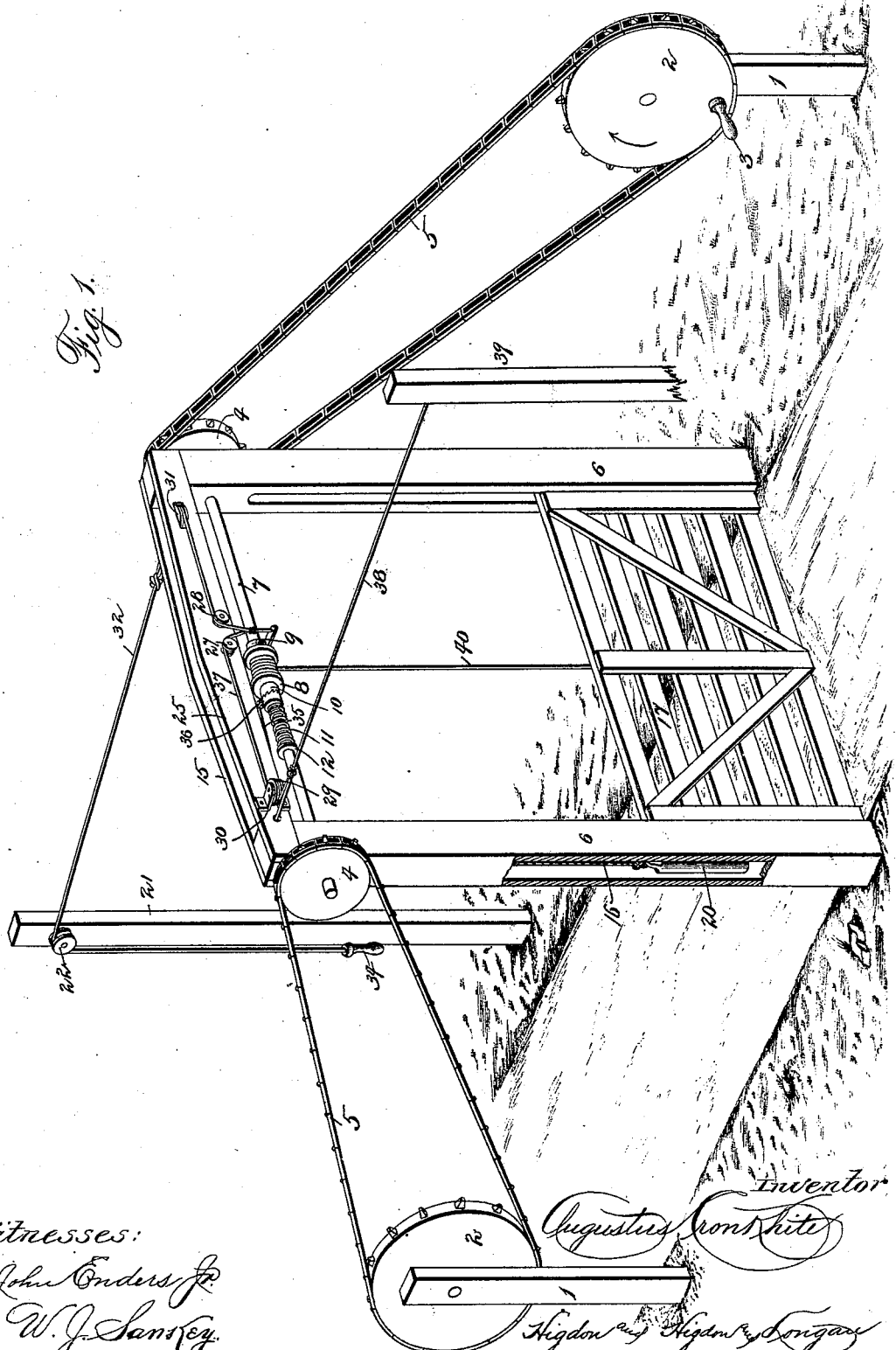
Witnesses:
John Enders Jr.
W. J. Sansey.
Inventor
Augustus Cronkhite
Higdon and Higdon & Longan
Att'ys.

(No Model.) 2 Sheets—Sheet 2.
A. CRONKHITE.
GATE.
No. 517,331. Patented Mar. 27, 1894.
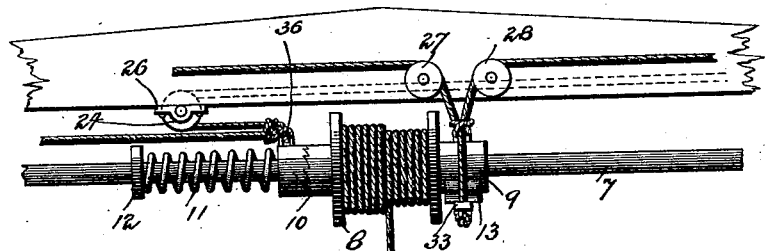
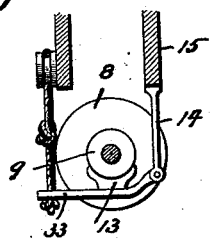
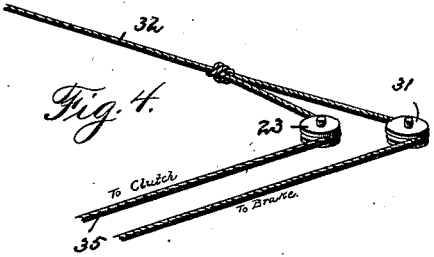
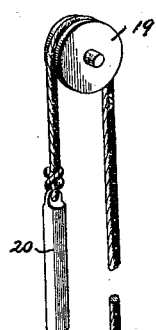
Witnesses:
John Enders Jr
W. J. Sankey
Inventor
Augustus Cronkhite
by
Higdon & Higdon and Longan
Att'ys.

UNITED STATES PATENT OFFICE.

AUGUSTUS CRONKHITE, OF CHICAGO, ILLINOIS.

GATE.

SPECIFICATION forming part of Letters Patent No. 517,331, dated March 27, 1894.

Application filed July 24, 1893. Serial No. 481,288. (No model.)

*To all whom it may concern:*

Be it known that I, AUGUSTUS CRONKHITE, of Chicago, Cook county, State of Illinois, have invented certain new and useful Improvements in Gates, of which the following is a full, clear, and exact description, reference being had to the accompanying drawings, forming a part hereof.

My invention relates to an improved gate and consists in the novel arrangement, combination and construction of parts as will be more fully hereinafter described and designated in the claims.

In the drawings: Figure 1 is a perspective view of my improved gate parts being broken away. Fig. 2 is a detail of the mechanism which I use in carrying out my invention. Fig. 3 is a detail of a brake used in carrying out my invention. Fig. 4 is a detail perspective view of ropes and pulleys, used in operating my improved gate, and Fig. 5 is a detail in perspective of a weight showing its connection with the end of the gate.

The mechanism for the operation of my gate is identically the same coming from either direction, so I will limit myself to the description and operation of but one side.

1 indicates a post. Mounted on the post is a sprocket-wheel 2. Connected to the sprocket-wheel 2 is a handle 3 forming a hand-crank for the purpose of manually rotating said sprocket-wheel. 4 is another sprocket wheel somewhat smaller in diameter than the sprocket wheel 2.

5 indicates a sprocket chain which connects the sprocket wheel 2 and the sprocket-wheel 4.

6 indicates a vertical hollow post. Mounted in the two gate posts 6 adjacent to their upper ends is a shaft 7 which extends continuously in a horizontal line from one of said posts to the other. Formed on or fixed to the shaft 7 is a spool or drum 8. Formed on or fixed to the shaft 7 adjacent the spool or drum 8 is a brake-wheel 9.

10 indicates a clutch mounted on shaft, 7, one portion of which is fixed to said shaft, and connected to the spool on the opposite side from the brake-wheel 9, and the other portion of which is loosely mounted to slide longitudinally on said shaft and is normally held in engagement with said fixed portion by a spring 11.

12 indicates a collar formed on or fixed to the shaft 7 to retain the spring in its required position.

13 indicates a brake-shoe pivotally connected to a vertical arm 14, said arm being connected to the overhead horizontal bar or portion 15 of the gate-frame.

16 indicates a rope or common chain or cable which has its lower end connected to the bottom corner of the gate 17 by means of an eye or hook 18, said rope extending upwardly on the interior of the vertical hollow post and over a pulley 19 and downwardly a short distance and connected to a weight 20. Said pulley and said weight are both mounted within said hollow post. The weight 20 is to assist in balancing the gate when it is in operation.

Set in the ground on the same side of the roadway as is the post 1, but on the opposite side of the gate and located a distance therefrom, is another post 21.

Mounted on the post 21 is a pulley 22. Mounted in suitable bearings in or upon the overhead horizontal bar 15 is another pulley 23 adjacent the end of said bar. 24 is another pulley which is held in position by bearings 26 upon the under side of the overhead horizontal bars 15 and 25 directly above the spring 11 intermediate of its ends.

27 and 28 indicate pulleys located on the outside of the overhead horizontal bar 25 on the side facing the post 1. 29 indicates another pulley which is held in position by bearings 30, said bearings being connected to the portion of the bar 25 adjacent to the end thereof which is located the greatest distance from the pulley 23. 31 indicates another pulley located upon the same side of bar 25 upon which the pulley 29 is located and adjacent to the pulley 23.

32 indicates a rope or common chain or cable one end of which is connected to the arm 33 of the brake-shoe 13. The rope 32 passes up from the arm 33 and over the pulley 28, thus along and parallel with the bar 25 and over the pulley 31, thence outwardly and parallel with the ground and over the pulley 22, thence downwardly a suitable distance, and is provided with a handle 34 for the purpose hereinafter mentioned. Knotted to the rope 32 a suitable distance outward from the frame 15 is another rope 35, which passes inward over the pulley 23 and thence along the lower edge of the bar 25 and over the pulley 26 and back and is knotted to an eye 36 on the upper side of the clutch 10. 37 indicates another rope, one end of which is knotted to the rope 32 adjacent the arm 33 of the brake-shoe and passes upwardly over the pulley 27, thence along the bar 25 and over the pulley, thence outwardly from said bar a suitable distance and it is knotted to the rope 38. One end of another rope 38 is connected to the eye 36 and thence passes along parallel to the frame and over another pulley, thence outwardly to a post 39 and thence downward for the purpose hereinafter mentioned. The post 39 is identical in construction with the post 21, previously described, and it is located on the same side of the gate as is the post 1, but on the side of the roadway which is opposite that on which said post 1 is located, and it is preferably at the same distance from the gate-post as is the post 21. The posts 21 and 39 are thus located on diagonally opposite sides of the roadway, and on opposite sides of the gateway. 40 indicates another rope, the lower end of which is connected to the gate 17 adjacent its center and passes upwardly and is wound on the spool or drum 8, for the purpose hereinafter mentioned.

The operation is as follows: The gate being down as shown in Fig. 1, when it is desired to raise it the operator turns the sprocket wheel 2 by means of a handle 3 in the direction indicated by the arrow; in so doing he will turn the wheel 4 by means of the sprocket chain connected with both of said sprocket wheels. The sprocket wheel 4 being keyed or fast to the end of the shaft 7, this shaft will also rotate thereby turning the spool 8 in the required direction, and winding up the rope 40, and elevating the gate bodily a corresponding distance. When the gate is raised to the desired height, the sliding portion of the clutch 10 being held in engagement with the fixed portion thereof and thereby connected to the spool 8 by means of the spring 11, will hold the gate up until said clutch is released. When the gate is up and it is desired to let it down again the operator draws down on the handle 34 which is connected to the outer end of the rope 32, thereby releasing the clutch from engagement with the spool and upon the clutch being released the gate immediately gravitates downward. To prevent the gate from closing too rapidly, the operator draws with increased force on the rope 32, and by so doing he applies the brake which prevents the gate from falling down and breaking same. The relative lengths of the ropes or cables 32 and 35 between the point at which they are knotted or otherwise united, and the clutch 10 and the brake mechanism, is such that when the operator draws the handle 34 downward the said clutch will be released prior to the application of the brake. The mechanism above described is duplicated to permit the operation of the gate by the operator approaching or receding from said gate in either direction upon the roadway, as has already been intimated. The weight of the gate 17 should considerably exceed that of the counterbalances 20 in the posts 6 to accomplish the operation above described.

What I claim is—

1. The combination with a lifting gate and its supporting posts fixed one upon each side of a roadway, of a post 1 located also upon one side of a roadway but separated a distance from the supporting posts of the gate on that side of said roadway, a sprocket-wheel 2 mounted on said post 1 and provided with a handle 3 forming a hand-crank by which said sprocket-wheel may be revolved, a shaft 7 mounted in bearings in said supporting posts of the gate, and extending continuously in a horizontal plane above said gate, a sprocket-wheel 4 fixed upon said shaft, a sprocket-chain 5 mounted on said wheels 2 and 4 and connecting the same, a rope or flexible connection 40 secured to said gate and wound about a spool or drum 8 formed on or fixed to said shaft, a brake-wheel 9 formed on or fixed to said shaft adjacent to said spool or drum, a brake-shoe 13 pivotally connected to an overhead portion of the supports for the gate so as to engage with and release said brake-wheel, a clutch 10 mounted on said shaft, the fixed portion of which is secured to said shaft and revolves therewith, and the other portion of which is loosely mounted to slide longitudinally on said shaft, a collar 12 fixed to said shaft, a spring 11 engaging said collar and the loose portion of said clutch, and normally holding said loose portion in contact with said fixed portion of the clutch, a post 21 located on the same side of the roadway as is the post 1 but on the opposite side of the gate from that on which said post 1 is located, at a distance from the supporting posts of the gate, a pulley 22 mounted on said post 21, and a rope 32 mounted on said pulley 22 and provided with a handle 34 and connected to said brake-shoe and with a loose portion of said clutch, substantially as herein specified.

2. The combination with a lifting gate and its supporting posts 6 fixed one upon each side of a roadway, of two posts 1 located one on each side of said gate and one on each side of said roadway but separated a distance from said supporting posts of the gate, a sprocket-wheel 2 mounted on each of said posts 1 and provided with a handle 3 forming a hand-crank by means of which said sprocket-wheel may be revolved, a shaft 7 mounted in bearings in said supporting posts of the gate and extending continuously in a horizontal plane above said gate, two sprocket-wheels 4 fixed upon said shaft, two sprocket-chains 5, one of which engages the sprocket-wheels 2 and 4 on one side of the roadway, and the other of which engages the sprocket-wheels 2 and 4 on the opposite side of the roadway, a rope or flexible connection 40 secured to said gate, a spool or drum 8 formed on or fixed to said shaft, said rope 40 being wound about said spool, a brake-wheel 9 formed on or fixed to said shaft adjacent to said spool or drum, a brake-shoe 13 pivotally connected to an overhead portion of the supports for the gate so as to engage with and release said brake-wheel, a two part clutch 10 mounted on said shaft the fixed portion of which is secured to and revolves therewith, and the other portion of which is loosely mounted to slide longitudinally on said shaft, a collar 12 fixed to said shaft, a spring 11 engaging said collar and normally holding said loose-portion of said clutch in contact with the fixed portion thereof, two posts 21 located one on each side of said roadway and one on each side of said gate a distance therefrom, a pulley 22 mounted on each of said posts 21, a counterbalance-weight for said gate, and two ropes 32 engaging said pulley 22 and provided with handles 34 and connected to said brake-shoe and said loose portion of said clutch, substantially as and for the purpose herein specified.

In testimony whereof I affix my signature in presence of two witnesses.

AUGUSTUS CRONKHITE.

Witnesses:
A. A. BLANKENMEISTER,
JNO. C. HIGDON.